United States Patent
Otani

(10) Patent No.: US 10,942,358 B2
(45) Date of Patent: Mar. 9, 2021

(54) LIGHT EMITTING APPARATUS AND IMAGE DISPLAY SYSTEM

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 49 days.

(21) Appl. No.: 16/215,482

(22) Filed: Dec. 10, 2018

(65) Prior Publication Data

US 2019/0179158 A1   Jun. 13, 2019

(30) Foreign Application Priority Data

Dec. 11, 2017   (JP) .............................. JP2017-236661

(51) Int. Cl.
| | |
|---|---|
| *G02B 27/09* | (2006.01) |
| *G02B 27/30* | (2006.01) |
| *G06F 3/042* | (2006.01) |
| *G02B 19/00* | (2006.01) |
| *G02B 3/00* | (2006.01) |
| *G02B 27/12* | (2006.01) |

(52) U.S. Cl.
CPC ..... *G02B 27/0961* (2013.01); *G02B 19/0014* (2013.01); *G02B 27/30* (2013.01); *G06F 3/0421* (2013.01); *G06F 3/0425* (2013.01); *G02B 3/0043* (2013.01); *G02B 27/126* (2013.01)

(58) Field of Classification Search
None
See application file for complete search history.

(56) References Cited

U.S. PATENT DOCUMENTS

| | | | | | |
|---|---|---|---|---|---|
| 2,084,120 | A | * | 6/1937 | Ames ...................... | B60Q 1/05 362/507 |
| 7,839,573 | B2 | * | 11/2010 | Wippermann ......... | G02B 27/01 359/619 |
| 2005/0122308 | A1 | * | 6/2005 | Bell ........................ | G06F 3/011 345/156 |
| 2010/0302196 | A1 | * | 12/2010 | Han ....................... | G06F 3/0425 345/173 |
| 2012/0026093 | A1 | * | 2/2012 | Duparre .............. | G06F 3/03547 345/166 |

(Continued)

FOREIGN PATENT DOCUMENTS

JP        2015-111385 A       6/2015

*Primary Examiner* — Brian M Butcher
(74) *Attorney, Agent, or Firm* — Oliff PLC

(57) ABSTRACT

A light emitting apparatus includes a light emitting unit. The light emitting unit includes a light source, a collimator lens, and an optical element that spreads light transmitted through the collimator lens in a direction corresponding to a width direction. The optical element has a plurality of lens groups arranged in a first direction (stacking direction), each of the plurality of lens groups has a plurality of small lenses arranged in a second direction orthogonal to the first direction and crossing an optical axis, each of the plurality of small lenses is formed to spread entering light in a direction corresponding to the width direction so that the lights spread by the small lenses adjacent in a second direction are superimposed, and the plurality of lens groups have the small lenses with the small lenses adjacent in the first direction and the second direction in different sizes from each other.

8 Claims, 9 Drawing Sheets

(56) References Cited

U.S. PATENT DOCUMENTS

| | | | |
|---|---|---|---|
| 2014/0307179 A1* | 10/2014 | Zhao | G03H 1/02 |
| | | | 349/12 |
| 2015/0116216 A1 | 4/2015 | Sakai et al. | |
| 2015/0310670 A1* | 10/2015 | Grossinger | G02B 27/017 |
| | | | 345/156 |
| 2018/0188542 A1* | 7/2018 | Waldern | G02B 27/0176 |

* cited by examiner

LIGHT EMITTING APPARATUS AND IMAGE DISPLAY SYSTEM

BACKGROUND

1. Technical Field

The present invention relates to a light emitting apparatus and image display system.

2. Related Art

In related art, image display systems that detect positions of pointers (e.g. pens, fingers of users, etc.) operated on display surfaces on which images are displayed, provide displays according to trajectories of the pointers and change displays based on the detection results are known. For example, an image display system including a projector and a light emitting apparatus that emits light along a projection surface on which the projector projects, wherein the projector detects the position of a pointer using reflection of light by the pointer operated on the projection surface and performs projection based on the detection result is disclosed (for example, Patent Document 1 (JP-A-2015-111385)).

The light emitting apparatus disclosed in Patent Document 1 includes a light source, a collimator lens that collimates light emitted from the light source, and a directional lens (Powell lens) that spreads the light collimated in the collimator lens in a direction along the projection surface (first direction) and substantially maintains spreading in a direction orthogonal to the projection surface (second direction).

The Powell lens is formed in a convex-surface shape on a light-incident side and a flat shape on a light-exiting side as seen from the second direction, and in a rectangular shape as seen from the first direction.

However, in the light emitting apparatus disclosed in Patent Document 1, when the light source and the Powell lens are misaligned, deviation of light intensity on the projection surface becomes significant and it is harder for the projector to accurately detect the position of the pointer. Accordingly, highly-accurate alignment of the light source and the Powell lens is required, and the light emitting apparatus disclosed in Patent Document 1 has a problem of increase in adjustment man-hour, i.e., assembly man-hour.

SUMMARY

An advantage of some aspects of the invention is to solve at least a part of the problems described above, and the invention can be implemented as the following forms or application examples.

Application Example 1

A light emitting apparatus according to this application example is a light emitting apparatus including a light emitting unit, and the light emitting unit includes a light source, a collimator lens that light emitted from the light source enters, and an optical element that spreads the light transmitted through the collimator lens in a direction corresponding to a predetermined direction orthogonal to an optical axis of the light source, wherein the optical element has a plurality of lens groups arranged in a first direction orthogonal to the optical axis and the predetermined direction, each of the plurality of lens groups has a plurality of small lenses arranged in a second direction orthogonal to the first direction and crossing the optical axis, each of the plurality of small lenses is formed to spread entering light in a direction corresponding to the predetermined direction so that the lights spread by the small lenses adjacent to each other in the second direction are superimposed, and the plurality of small lenses of the plurality of lens groups have the small lenses with the small lenses adjacent in the first direction and the second direction in different sizes from each other.

According to the configuration, the light emitting apparatus spreads and emits the light emitted from the light source and nearly collimated in the collimator lens in the direction corresponding to the predetermined direction using the optical element. Thereby, the light emitting apparatus placed on an end side of a predetermined flat surface (object flat surface) and emitting light spread along the object flat surface can be provided. Further, the optical element has the plurality of small lenses arranged in the second direction and the plurality of small lenses spread the entering light in the direction corresponding to the predetermined direction. Thereby, the light emitting apparatus can emit light with suppressed deviation of the light intensity distribution in the area along the object flat surface even when the alignment accuracy between the light source and the optical element is relaxed compared to a configuration having a lens for spreading formed with a single lens.

Further, in the optical element, the plurality of lens groups having the pluralitys of small lenses arranged in the second direction are arranged in the first direction, and have the small lenses with the small lenses adjacent in the respective directions in the different sizes from each other. Thereby, interference fringes due to interferences between the lights emitted from the small lenses adjacent in the second direction can be suppressed. Furthermore, in the light emitted from one lens group, higher and lower intensity parts are generated in the intensity distribution with respect to the angle from the center of the emitted light, that is, noise is generated in the intensity distribution. However, the plurality of lens groups have different angle dependencies of the intensity distributions from one another, and thereby, the higher and lower levels of intensity are relaxed and noise of the intensity distribution of the light emitted from the optical element is reduced. Accordingly, the light emitting apparatus that emits light with further suppressed deviation of the light intensity distribution in the area along the object flat surface and reduced noise can be provided.

Therefore, the light emitting apparatus with reduced assembly man-hour that emits light with suppressed deviation of the light intensity distribution and noise in the area along the object flat surface can be provided.

Application Example 2

In the light emitting apparatus according to the application example, it is preferable that the plurality of lens groups are provided on a light-incident side of the optical element and have first to nth (n is an integer equal to or larger than two) lens groups sequentially placed in a stepped pattern from one end side to the other end side in the first direction, and the plurality of small lenses in the nth lens group project further than the small lenses adjacent in the first direction in the (n−1)th lens group.

According to the configuration, the optical element is formed so that the respective small lenses does not hide behind the other small lenses as seen from the one end side in the first direction. Thereby, the optical element can be manufactured using a mold without undercut or draft angle that affects optical characteristics. Therefore, the optical element that offers the above described advantages and is easily manufactured, i.e., the light emitting apparatus that is easily manufactured even in the configuration having the small lenses with the adjacent small lenses in the different sizes from each other can be provided.

Application Example 3

In the light emitting apparatus according to the application example, it is preferable that a first of the light emitting unit and a second of the light emitting unit that emit lights mainly in different directions from each other are provided, and the first light emitting unit and the second light emitting unit are placed so that respectively spread lights travel along a predetermined flat surface and parts of the respectively spread lights overlap with each other.

According to the configuration, the light emitting apparatus includes the first light emitting unit and the second light emitting unit placed as described above, and thereby, can emit light along the wider object flat surface.

Application Example 4

In the light emitting apparatus according to the application example, it is preferable that the first light emitting unit has a first optical path from the light source to the optical element of the first light emitting unit, the second light emitting unit has a second optical path from the light source to the optical element of the second light emitting unit, and, in the first light emitting unit and the second light emitting unit, the first optical path and the second optical path cross at upstream of the optical element in the first light emitting unit and the optical element in the second light emitting unit.

According to the configuration, the first light emitting unit and the second light emitting unit are placed so that the first optical path and the second optical path cross. Thereby, the light emitting apparatus can formed with the optical element in the first light emitting unit and the optical element in the second light emitting unit closer to each other. Accordingly, the position in which the lights emitted from the respective first light emitting unit and second light emitting unit overlap are made closer to the light emitting apparatus. Therefore, the light emitting apparatus that can be downsized in the direction in which the optical elements of the respective first light emitting unit and second light emitting unit are arranged and placed closer to the object flat surface can be provided.

Application Example 5

An image display system according to this application example includes the above described light emitting apparatus, a detection apparatus that detects a reflection position of light emitted from the light emitting apparatus, and a projection apparatus that projects an image according to a detection result detected by the detection apparatus.

According to the configuration, the image display system includes the above described light emitting apparatus, and thereby, can accurately detect the position of a pointer or the like operated on a projection surface and project an image according to the detection result e.g. an image containing the trajectory of the pointer on the projection surface on the projection surface using the projection apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of the invention will be explained with reference to the drawings. Note that, in the following respective drawings, dimensions and ratios of the respective component elements are appropriately made different from real ones into sizes that can be recognized on the drawings.

Figure 1:
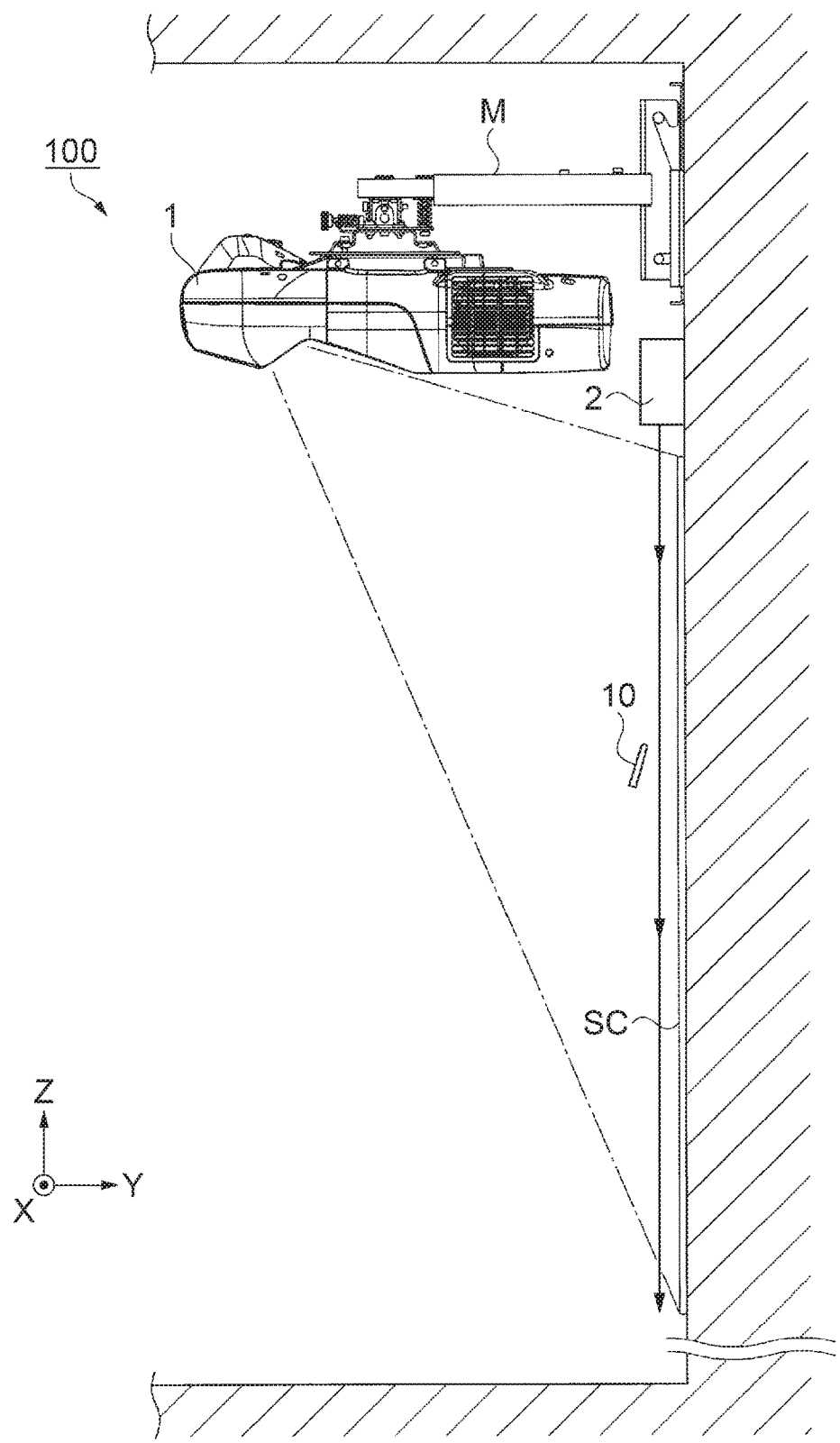
FIG. 1 is a schematic diagram showing a general configuration of an image display system according to an embodiment.

FIG. 1 is a schematic diagram showing a general configuration of an image display system 100 according to an embodiment.

As shown in FIG. 1, the image display system 100 includes a projector 1 and a light emitting apparatus 2.

Figure 2:
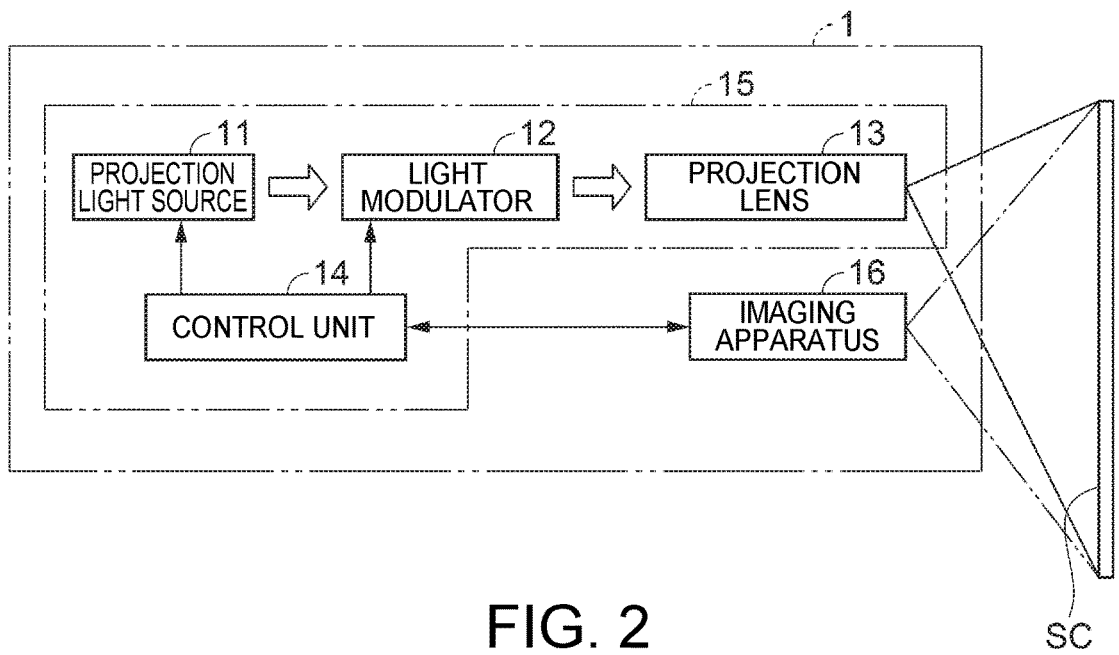
FIG. 2 is a block diagram showing a general configuration of a projector of the embodiment.

FIG. 2 is a block diagram showing a general configuration of the projector 1.

As shown in FIG. 2, the projector 1 includes a projection apparatus 15 and an imaging apparatus 16 as a detection apparatus.

The projection apparatus 15 includes a projection light source 11, a light modulator 12, a projection lens 13, and a control unit 14, and projects an image according to input image information and an image according to a detection result detected by the imaging apparatus 16.

As shown in FIG. 1, the projector 1 is supported by a supporter M placed on a wall surface above a projection surface SC such as a screen or a white board, and projects an image on the projection surface SC toward the downside. Note that, hereinafter, for convenience of explanation, as shown in FIG. 1, normal directions with respect to the projection SC are referred to as forward and backward directions, and the direction toward the projection surface SC is referred to as "forward direction (+Y-direction)", the direction opposite to the direction of gravitational force is referred to as "upward direction (+Z-direction)", and the right side when facing the projection surface SC is referred to as "rightward direction (+X-direction)".

The projection apparatus 15 modulates the light emitted from the projection light source 11 according to image information in the light modulator 12, and projects the modulated light from the projection lens 13 on the projection surface SC. Note that, as the projection light source 11, a discharge-type light source or solid-state light source such as a light emitting diode or laser may be used. Further, as the light modulator 12, a device using a liquid crystal panel, micromirror-type device e.g. a device using a DMD (Digital Micromirror Device) or the like may be used.

The control unit 14 includes a CPU (Central Processing Unit), ROM (Read Only Memory), RAM (Random Access Memory), etc. and functions as a computer, and performs control of the operation of the projector 1 e.g. control relating to projection of images based on information output from the imaging apparatus 16, which will be described later, or the like.

As will be described later in detail, as shown in FIG. 1, the light emitting apparatus 2 is installed above the projection surface SC and emits light along the projection surface SC.

The imaging apparatus 16 includes e.g. an image pickup device (not shown) such as a CCD (Charge Coupled Device) or CMOS (Complementary Metal Oxide Semiconductor), and images the projection surface SC as a subject and outputs imaged information to the control unit 14. Further, the imaging apparatus 16 detects a position (reflection position) of a pointer (e.g. a pen 10, user's finger, or the like) by reflection of the light emitted from the light emitting apparatus 2 by the pointer and outputs the detected information to the control unit 14.

The projector 1 analyzes the position of the pointer on the projection surface SC based on the information output from the imaging apparatus 16, and projects a superimposed image formed by superimposition of a line showing a trajectory of the pointer on image information, changes the projected image, and otherwise based on the analysis result.

Configuration of Light Emitting Apparatus

Here, the light emitting apparatus 2 is explained in detail.

Figure 3:
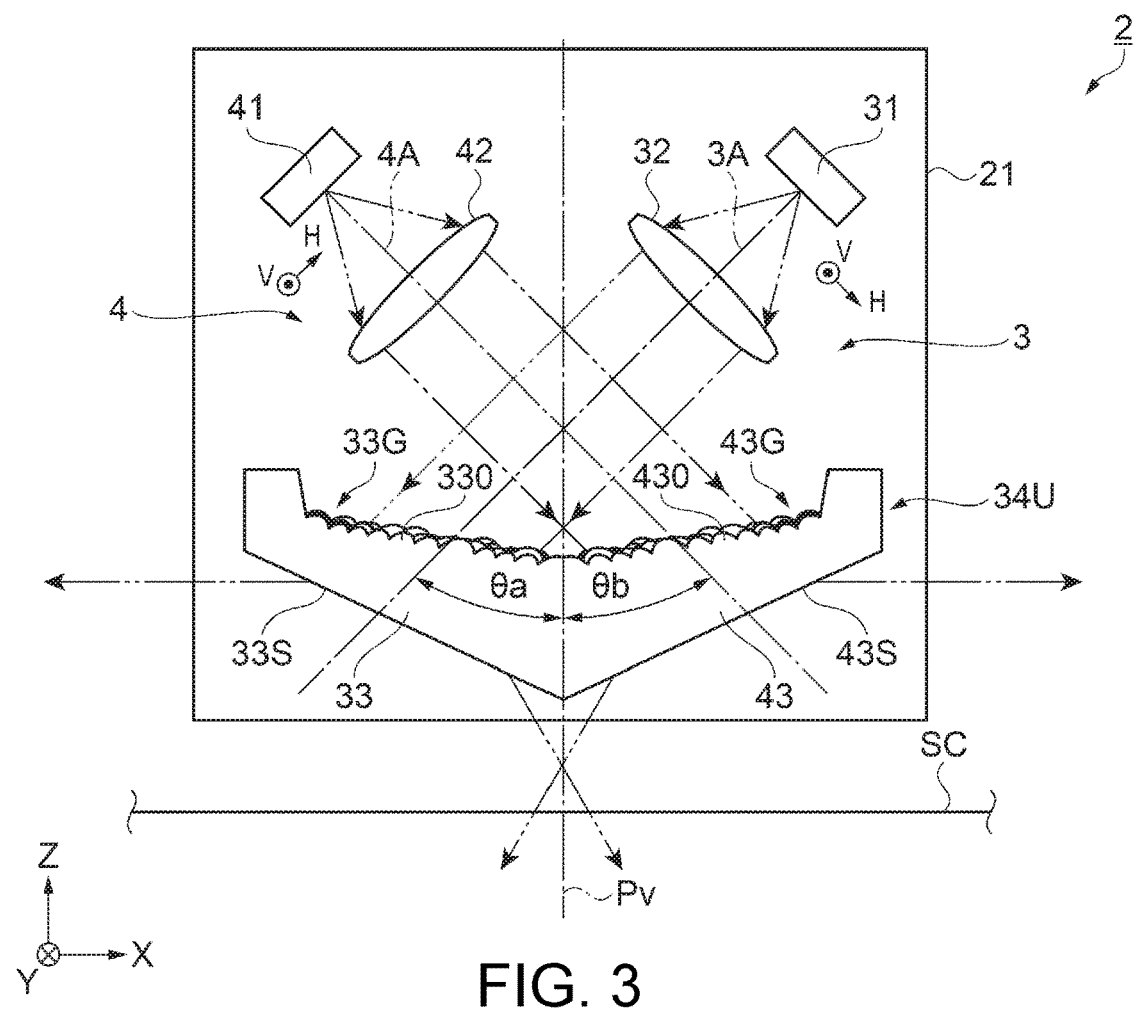
FIG. 3 is a schematic diagram showing a general configuration of a light emitting apparatus of the embodiment.

FIG. 3 is a schematic diagram showing a general configuration of the light emitting apparatus 2.

As shown in FIG. 3, the light emitting apparatus 2 is placed nearly at the center of the projection surface SC in the leftward and rightward directions above the projection surface SC. The light emitting apparatus 2 includes a first light emitting unit 3, a second light emitting unit 4, and a housing 21 that houses these units.

The first light emitting unit 3 and the second light emitting unit 4 are arranged in the leftward and rightward directions and emit lights mainly in directions different from each other.

The first light emitting unit 3 includes a first light source 31, a first collimator lens 32, and a first optical element 33, and has a first optical path from the first light source 31 to the first optical element 33. In the first light emitting unit 3, the first collimator lens 32 and the first optical element 33 are placed on an optical axis 3A of the first light source 31 and emits light mainly obliquely leftward and downward.

Like the first light emitting unit 3, the second light emitting unit 4 includes a second light source 41, a second collimator lens 42, and a second optical element 43, and has a second optical path from the second light source 41 to the second optical element 43. In the second light emitting unit 4, the second collimator lens 42 and the second optical element 43 are placed on an optical axis 4A of the second light source 41 and emits light mainly obliquely rightward and downward.

In the light emitting apparatus 2, the first optical element 33 and the second optical element 43 are integrally formed and the first optical path and the second optical path cross at the upstream of the optical paths of the first optical element 33 and the second optical element 43. Specifically, in the light emitting apparatus 2, the first light source 31 and the first collimator lens 32 are placed on the right of the second light source 41 and the second collimator lens 42, and the first optical element 33 is placed on the left of the second optical element 43. Further, in the light emitting apparatus 2, the first optical path and the second optical path cross between the first collimator lens 32 and the first optical element 33 and between the second collimator lens 42 and the second optical element 43. Note that the integrated first optical element 33 and second optical element 43 are referred to as "optical element member 34U".

The first light source 31 and the second light source 41 are e.g. laser light sources that emit lights having peaks of light intensity at wavelengths of about 940 nm, and has active layers as light emitting parts, cladding layers stacked on both sides of the active layers, etc. Regarding the size of the light emitting part, the size in a width direction H orthogonal to a stacking direction V in which the cladding layers are stacked is larger than the size in the stacking direction V.

The first light source 31 emits light mainly along the optical axis 3A, and emits lights having different radiation intensity distribution between the stacking direction V and the width direction H orthogonal to each other and orthogonal to the optical axis 3A. Similarly, the second light source 41 emits light mainly along the optical axis 4A, and emits lights having different radiation intensity distributions between the stacking direction V and the width direction H orthogonal to each other and orthogonal to the optical axis 4A. The first light source 31 and the second light source 41 are placed so that the stacking direction V may be orthogonal to a plane along the projection surface SC (along the Y-direction) and the width direction H may be along the projection surface SC.

Further, the first light source 31 and the second light source 41 emit polarized lights parallel to the width directions H and P-polarized lights enter the respective first optical element 33 and second optical element 43. Compared to the case where S-polarized lights enter the first optical element 33 and the second optical element 43, the loss due to reflection in the first optical element 33 and the second optical element 43 is lower and the lights emitted from the first light source 31 and the second light source 41 are efficiently used.

The first collimator lens 32 nearly collimates the light emitted from the first light source 31. Similarly, the second collimator lens 42 nearly collimates the light emitted from the second light source 41.

The optical element member 34U of the integrated first optical element 33 and second optical element 43 is formed in a rectangular shape as seen from the Z-direction using a synthetic resin having a higher refractive index or the like. As shown in FIG. 3, the optical element member 34U has the first optical element 33 on the left and the second optical element 43 on the right and is formed symmetrically. The optical element member 34U is placed to be symmetric with respect to a virtual center plane Pv (a plane along the Y-Z plane) orthogonal to the projection surface SC and extending in the upward and downward directions.

Figure 4:
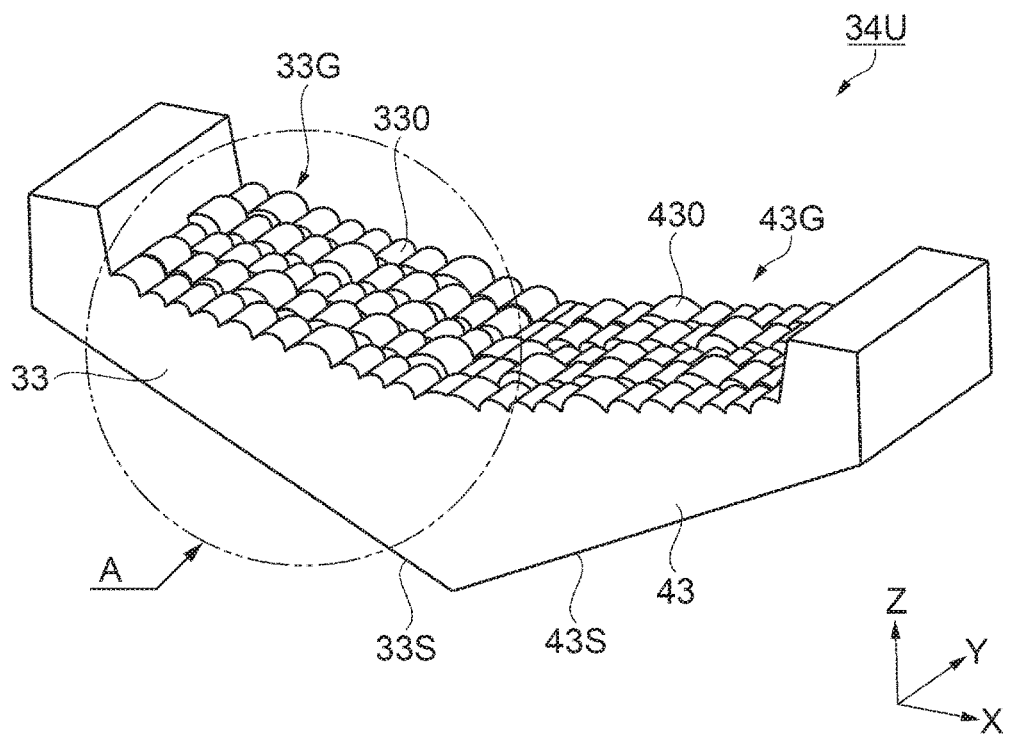
FIG. 4 is a perspective view showing an optical element member of the embodiment.
Figure 5:
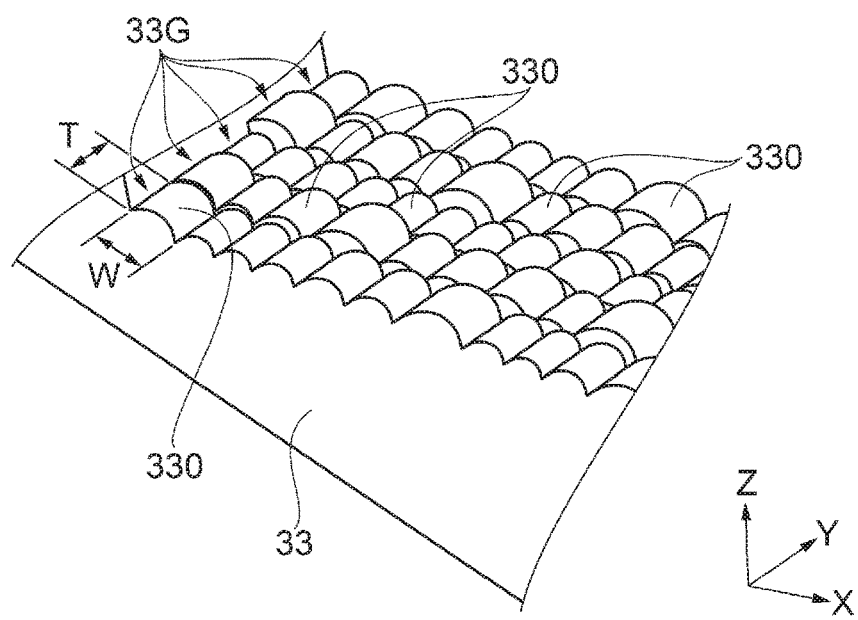
FIG. 5 is an enlarged view of part A in FIG. 4 and perspective view showing a light-incident side of a first optical element.

FIG. 4 is a perspective view showing the optical element member 34U. FIG. 5 is an enlarged view of part A in FIG. 4 and a perspective view showing the light-incident side of the first optical element 33.

The first optical element 33 spreads the light transmitted through the first collimator lens 32 in a direction corresponding to a predetermined direction (width direction H). As shown in FIGS. 3 to 5, the first optical element 33 has a plurality of lens groups 33G on the light-incident side (the side facing the first collimator lens 32) and has a flat surface 33S on the light-exiting side. The first optical element 33 tilts as a whole so that the distance from the first collimator lens 32 may be larger as the element is farther from the virtual center plane Pv.

The plurality of lens groups 33G are arranged in the stacking direction V (Y-direction). The stacking direction V corresponds to a first direction. The first optical element 33 of the embodiment has five lines of lens groups 33G. Further, each lens group 33G has a plurality of small lenses 330. Each small lens 330 is a convex lens extending along the stacking direction V. The plurality of small lenses 330 of each lens group 33G are arranged as a whole in a tilt direction, i.e., a direction orthogonal to the stacking direction V (first direction) and crossing the optical axis 3A (second direction).

The plurality of small lenses 330 of the plurality of lens groups 33G have the small lenses 330 with the small lenses 330 adjacent in the stacking direction V (first direction) and the second direction in different sizes from each other. Specifically, the small lens 330 is formed in a size having a dimension in the second direction (see FIG. 5, width W) from about 0.1 mm to 0.6 mm. Further, each lens group 33G is formed to have a dimension in the stacking direction V (Y-direction, first direction) (see FIG. 5, thickness T) from about 0.6 mm to 1 mm. Furthermore, the plurality of small lenses 330 are formed to have similar sections.

Figure 6:
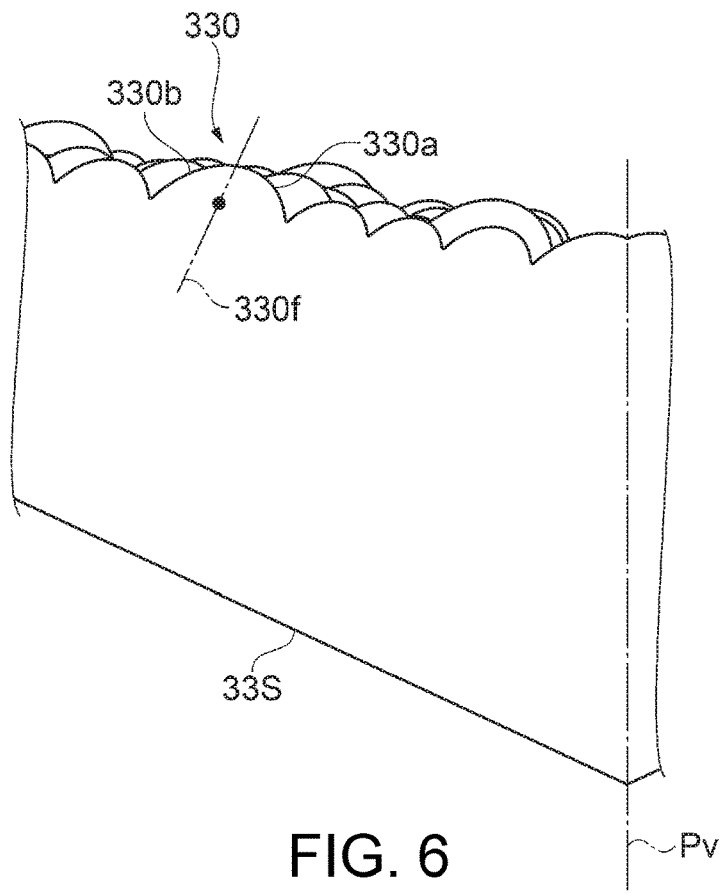
FIG. 6 is a plan view showing a part of the first optical element in the embodiment.

FIG. 6 is a plan view showing a part of the first optical element 33.

As shown in FIG. 6, the small lens 330 has a center axis along the stacking direction V and is formed in an aspherical shape asymmetric with respect to a lens center plane 330f passing through the center axis and orthogonal to the flat surface 33S. Specifically, the small lens 330 has a first surface 330a on the virtual center plane Pv side with respect to the lens center plane 330f and a second surface 330b on the opposite side to the first surface 330a of the lens center plane 330f. Further, the first surface 330a and the second surface 330b are asymmetrically formed. The shapes of the first surface 330a and the second surface 330b are formed so that the deviation of the light intensity distribution in the area along the projection surface SC can be suppressed.

Each small lens 330 transmits the light entering and being transmitted through the first collimator lens 32 without change in the stacking direction V and spreads the light in the width direction H (predetermined direction). Further, the plurality of small lenses 330 in each lens group 33G are formed so that the lights spread in the small lenses 330 adjacent in the second direction can be superimposed.

As described above, the first light emitting unit 3 has the plurality of small lenses 330 that spread the light entered by the first optical element 33 in the direction corresponding to the width direction H (predetermined direction), and thereby, alignment accuracy between the first light source 31 and the first optical element 33 can be relaxed.

The second optical element 43 is formed symmetrically with the first optical element 33, has a plurality of lens groups 43G on the light-incident side (the side facing the second collimator lens 42), and has a flat surface 43S on the light-exiting side. The plurality of lens groups 43G have plurality of small lenses 430 formed symmetrically with the plurality of small lenses 330 in the first optical element 33. The second optical element 43 transmits the light nearly collimated by the second collimator lens 42 without change in the stacking direction V and spreads the light in the predetermined direction (width direction H) using the plurality of small lenses 430. Each lens group 43G has the plurality of small lenses 430 having different sizes like each lens group 33G.

As will be described later in detail, the first light emitting unit 3 emits light with suppressed interferences and noise because the first optical element 33 has the plurality of small lenses 330 in the different sizes. Similarly, the second light emitting unit 4 emits light with suppressed interferences and noise because the second optical element 43 has the plurality of small lenses 430 in the different sizes.

The first light emitting unit 3 and the second light emitting unit 4 are placed so that the width directions H of the lights emitted from the first optical element 33 and the second optical element 43 are along the projection surface SC. That is, the first light emitting unit 3 and the second light emitting unit 4 are placed so that the lights spread in the first optical element 33 and the second optical element 43 are along a predetermined flat surface (the projection surface SC).

Further, as shown in FIG. 3, the light emitting apparatus 2 is placed so that the first light emitting unit 3 and the second light emitting unit 4 can tilt in the different directions with respect to the virtual center plane Pv and parts of the lights emitted from the respective first light emitting unit 3 and second light emitting unit 4 can overlap on the virtual center plane Pv.

Specifically, as shown in FIG. 3, the first light emitting unit 3 is placed so that the optical axis 3A may have a tilt angle θa in the clockwise direction with respect to the virtual center plane Pv as seen from the −Y-direction. The second light emitting unit 4 is placed so that the optical axis 4A may have a tilt angle θb in the counterclockwise direction with respect to the virtual center plane Pv. Further, the first light emitting unit 3 and the second light emitting unit 4 of the embodiment are placed nearly symmetrically with respect to the virtual center plane Pv (θa=θb). The light emitting apparatus 2 emits light to an area along the whole projection surface SC.

In the light emitting apparatus 2, the first optical path and the second optical path cross, and thereby, as shown in FIG. 3, the lights emitted from the respective first light emitting unit 3 and second light emitting unit 4 intersect in a position near the light emitting apparatus 2. That is, the light emitting apparatus 2 can emit light having sufficient light intensity to a nearby region. Thereby, the light emitting apparatus 2 emits light having light intensity with which the pointer can be detected even when the apparatus is placed near the projection surface SC or even in a region near the light emitting apparatus 2 on the projection surface SC.

Figure 7:
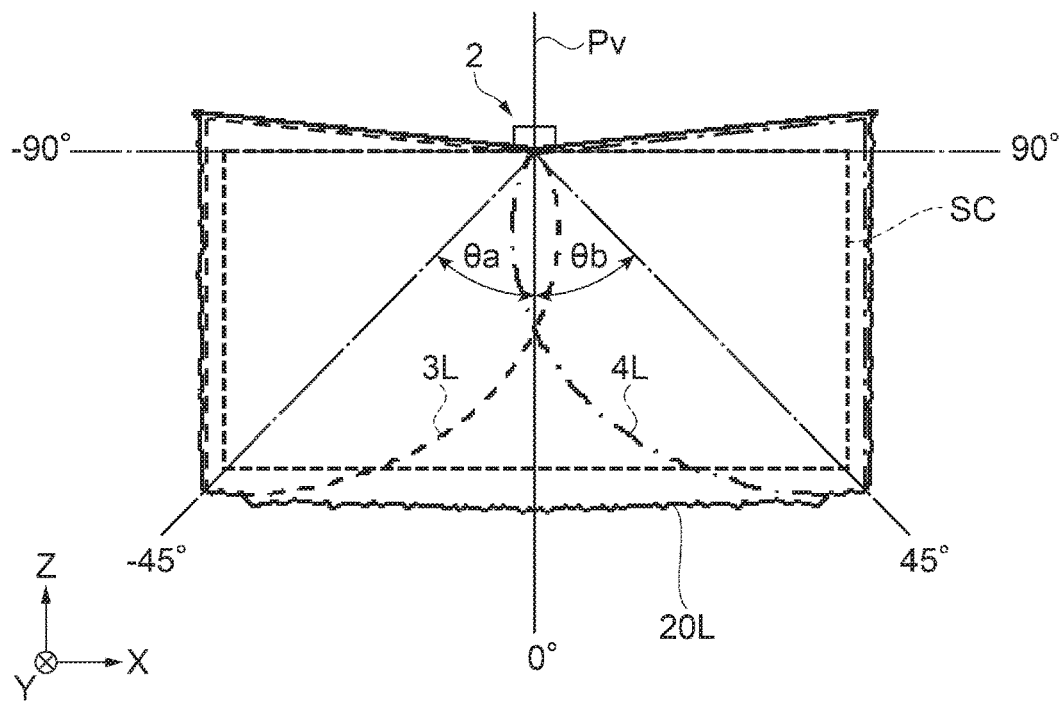
FIG. 7 shows intensity distributions of lights emitted from the light emitting apparatus of the embodiment in an area along a projection surface.

FIG. 7 shows intensity distributions of lights emitted from the light emitting apparatus 2 in the area along the projection surface SC. Specifically, FIG. 7 shows an intensity distribution 3L of the light emitted from the first light emitting unit 3 (first emitted light), an intensity distribution 4L of the light emitted from the second light emitting unit 4 (second emitted light), and an intensity distribution 20L of a combined light formed by combination of the first emitted light and the second emitted light. Note that the distances between the parts that emit the lights of the respective first light emitting unit 3 and second light emitting unit 4 and the virtual center plane Pv are extremely small compared to the size of the projection surface SC, and, for explanation of the intensity distributions, as shown in FIG. 7, the parts that emit the lights of the respective first light emitting unit 3 and second light emitting unit 4 may be approximated to be located on the virtual center plane Pv. Further, the intensity distributions 3L, 4L shown in FIG. 7 show ranges of light intensity of the respective first emitted light and second emitted light with which the pointer can be detected, and the intensity distribution 20L shows a range of light intensity of the combined light of the first emitted light and second emitted light with which the pointer can be detected.

Figure 8:
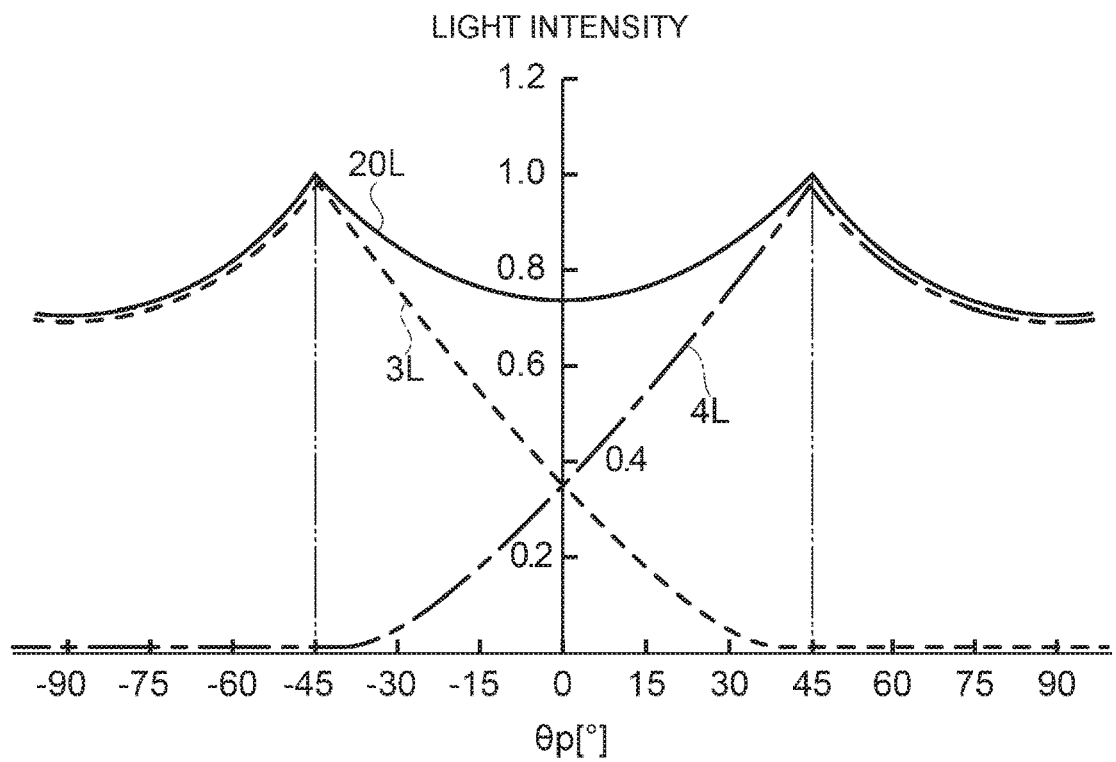
FIG. 8 is a graph theoretically showing intensity distributions of lights emitted from the light emitting apparatus of the embodiment.

FIG. 8 is a graph theoretically showing intensity distributions of lights emitted from the light emitting apparatus 2, and showing a relationship between an angle θp with respect to the virtual center plane Pv (see FIG. 7) and relative light intensity. Specifically, FIG. 8 is the graph showing an intensity distribution 3L of the first emitted light, an intensity distribution 4L of the second emitted light, and an intensity distribution 20L of a combined light formed by combination of the first emitted light and the second emitted light.

The light emitting apparatus 2 of the embodiment is set to emit light efficiently along the horizontally long projection surface SC having a ratio of the lateral length (X-direction) to the longitudinal length (Y-direction) at 2:1.

It is desired that the lights emitted from the light emitting apparatus 2 have peaks of intensity toward the left and right ends of the lower side of the projection surface SC as positions farthest from the light emitting apparatus 2. Accordingly, in the light emitting apparatus 2 of the embodiment, as shown in FIG. 7, assuming that the angle tilting counterclockwise with respect to the virtual center plane Pv is + (positive), the tilt angle θa of the first light emitting unit 3 (see FIG. 3) is set to −45° and the tilt angle θb of the second light emitting unit 4 (see FIG. 3) is set to 45°.

As shown in FIG. 8, the first emitted light has the highest intensity at θp of −45° toward the lower end on the left as a position farthest from the first light emitting unit 3 in the area irradiated by the first light emitting unit 3 on the projection surface SC. Similarly, the second emitted light has the highest intensity at θp of 45° toward the lower end on the right as a position farthest from the second light emitting unit 4 in the area irradiated by the second light emitting unit 4 on the projection surface SC.

As described above, the small lens 330 is formed asymmetrically with respect to the lens center plane 330f (see FIG. 6), and further, formed to have the following light intensity distributions. That is, as shown in FIG. 8, in the intensity distribution 3L of the first emitted light, the light intensity in the area in which θp is nearer the plus side than −45° (the side closer to the virtual center plane Pv) is lower than the light intensity in the area in which θp is nearer the minus side than −45° (the side farther from the virtual center plane Pv).

Specifically, as shown by the intensity distributions 3L in FIGS. 7 and 8, the intensity of the first emitted light decreases as the angle θp is closer to the minus side from −45°, i.e., as the position is closer from the left end of the lower side of the projection surface SC toward the left end of the upper side of the projection surface SC according to the distance from the light emitting apparatus 2 to the left side of the projection surface SC. Further, as shown by the intensity distributions 3L in FIG. 7, the intensity of the first emitted light has light intensity with which the pointer can be detected in the area closer to the minus side than −45°.

Further, the intensity of the first emitted light decreases as θp is closer to the plus side from −45°, i.e., as the position is closer from the left end of the lower side of the projection surface SC toward the virtual center plane Pv. The decrease is steeper than the decrease in the area in which the angle θp is closer to the minus side from −45°. The first emitted light is also emitted toward the right side (+X-side) of the virtual center plane Pv in the area along the projection surface SC, however, particularly, the intensity of the light emitted toward the right side (+X-side) is lower.

On the other hand, as shown in FIGS. 7 and 8, the second emitted light has the intensity distribution 4L symmetric with the intensity distribution 3L of the first emitted light at the angle θp around 0°, and part of the light overlaps with part of the first emitted light on both sides of the virtual center plane Pv.

As shown in FIG. 8, the first emitted light and the second emitted light overlap between about 40° and −40° and have light intensity with which the pointer can be detected in the range. The intensity of the light (the combined light of the first emitted light and the second emitted light) emitted from the light emitting apparatus 2 is the highest at the angle θp of 45° and −45° and smoothly lower in the area at the other angles as shown by the intensity distribution 20L in FIG. 8. That is, the light emitted from the light emitting apparatus 2 is emitted along the whole projection surface SC with intensity according to the distances from the light emitting apparatus 2 to the respective sides of the projection surface SC, i.e., light intensity with which the pointer can be detected as shown by the intensity distribution 20L in FIG. 7.

In the above described manner, the light emitting apparatus 2 emits lights along the nearly whole area of the projection surface SC from the first light emitting unit 3 and the second light emitting unit 4. Note that the angles of the above described tilt angles θa and θb correspond to the projection surface SC having the above described aspect ratio, and, when the shape of the projection surface SC as an object is different (e.g. the projection surface SC having the aspect ratio of 16:9 or 4:3 or the like), it is desired that the angles are set to different angles corresponding to the shape.

As described above, the first light emitting unit 3 has the small lenses 330 with the small lenses 330 adjacent in the first direction and the second direction in different sizes from one another. Thereby, interference fringes and light intensity noise of the light emitted from the first light emitting unit 3 are suppressed.

First, the suppression of interferences of the lights emitted from the first light emitting unit 3 is explained in comparison with a configuration using an optical element having a different configuration as that of the embodiment. That is, the explanation will be made in comparison with a configuration using an optical element in which the plurality of small lenses placed along the second direction are formed in the same size and the plurality of small lenses are arranged in a single line (not shown, referred to as "optical element 510"). The light emitting unit including the optical element 510 in place of the first optical element 33 in the first light emitting unit 3 is referred to as "light emitting unit 500" (not shown).

In the case of the light emitting unit 500 having the different configuration from that of the embodiment, the small lenses are formed in the same size, and thereby, in the lights emitted from the respective small lenses, parts in which waves reinforce and parts in which waves cancel regularly and alternately appear due to phase differences, and brightness and darkness of lights, i.e., interference fringes are generated.

On the other hand, in the case of the first light emitting unit 3 of the embodiment, the small lenses 330 are provided with the small lenses 330 adjacent in the second direction in different sizes from each other, and thus, in the lights emitted from the respective small lenses, parts in which waves reinforce and parts in which waves cancel do not clearly appear due to phase differences, and brightness and darkness of lights, i.e., interference fringes are suppressed.

Next, suppression of generation of noise in the light emitted from the first light emitting unit 3 will be explained.

Figure 9:
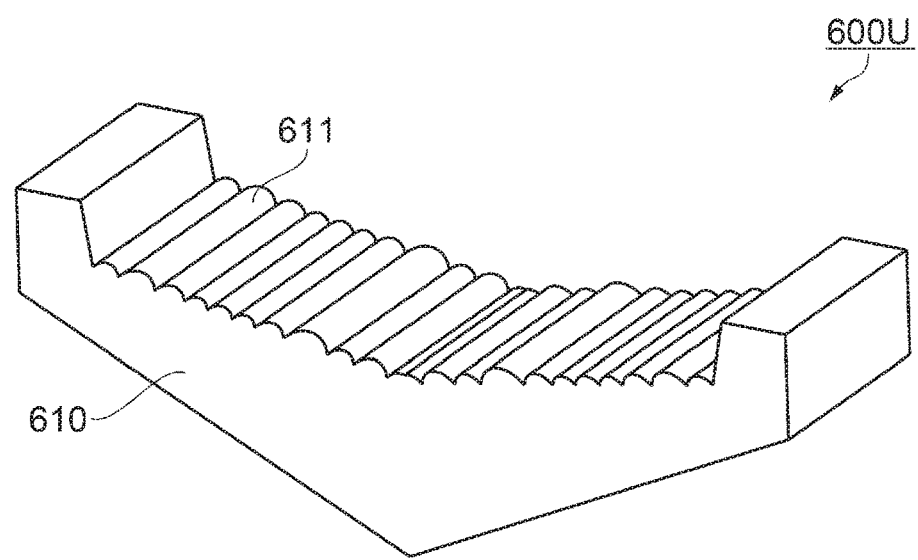
FIG. 9 is a perspective view of an optical element member having a different configuration from the optical element member of the embodiment.

In the above described light emitting unit 500, to suppress the generated interference fringes, a configuration using an optical element 610 shown in FIG. 9 is considered.

FIG. 9 is a perspective view of an optical element member 600U having a different configuration from the optical element member 34U of the embodiment. As shown in FIG. 9, the optical element member 600U includes the optical element 610 forming the left side of the optical element member 600U and having a single line of a plurality of small lenses 611 placed along the second direction. The plurality of small lenses 611 have the small lenses 611 with the small lenses 611 adjacent in the second direction in different sizes from each other.

The light emitting unit including the optical element 610 in place of the first optical element 33 in the first light emitting unit 3 is referred to as "light emitting unit 600" (not shown).

In the light emitted from the light emitting unit 600 having the different configuration from that of the embodiment, interference fringes are suppressed, but noise is generated in light intensity.

Figure 10:
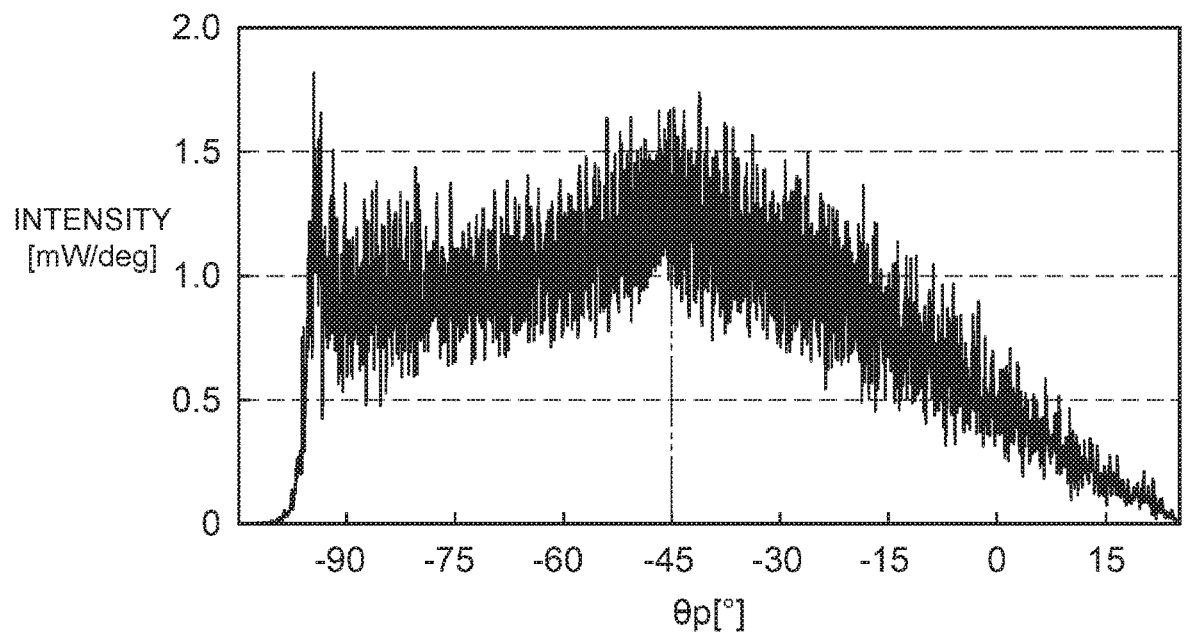
FIG. 10 is a graph showing a result of a simulation of an intensity distribution of light emitted from a light emitting unit having a different configuration from that of the embodiment.

FIG. 10 is a graph showing a result of a simulation of an intensity distribution of light emitted from the light emitting unit 600, and showing a relationship between the angle θp with respect to the virtual center plane Pv (see FIG. 7) and light intensity (mW/deg).

As shown in FIG. 10, the intensity distribution of the light emitted from the light emitting unit 600 shows the same tendency as the theoretical intensity distribution 3L (see FIG. 8) in which the intensity is highest at the angle θp of −45° and lower as the angle is farther from −45°, however, higher noise is generated. It is considered that this is because the sizes of the adjacent small lenses 611 are different from each other and interference fringes do not clearly appear, but random interference patterns appear.

On the other hand, in the intensity distribution of the light emitted from the first light emitting unit 3 of the embodiment, noise is lower.

Figure 11:
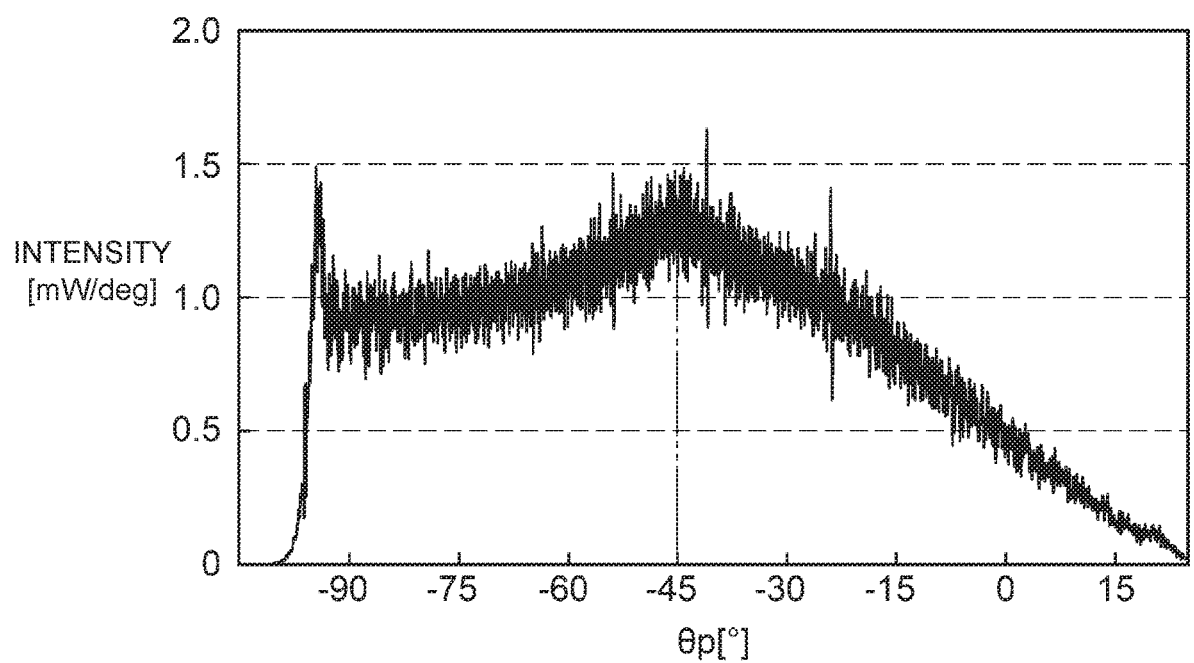
FIG. 11 is a graph showing a result of a simulation of an intensity distribution of light emitted from a first light emitting unit of the embodiment.

FIG. 11 is a graph showing a result of a simulation of an intensity distribution of light emitted from the first light emitting unit 3 of the embodiment.

As shown in FIG. 11, in the intensity distribution of the light emitted from the first light emitting unit 3 of the embodiment, noise is reduced by half compared to the intensity distribution of the light (see FIG. 10) emitted from the light emitting unit 600 (having the different configuration from that of the embodiment). It is considered that this is because the lights emitted from the respective lens groups 33 have different angle dependencies of the intensity distributions from one another, and, as the plurality of lens groups 33 as a whole, the higher and lower levels of intensity are relaxed, i.e., noise is reduced.

Accordingly, theoretically, the lower the noise, the larger the number of lens groups 33G. However, as the number of lens groups 33G is larger, the manufacture of the first optical element 33 can be harder and an optical effective area can be smaller in the manufacture. Therefore, it is desirable that the number of lens groups 33G is the number (lines) that can be manufactured with less optical loss. That is, in the embodiment, the configuration having the five lines of lens groups 33G is shown, however, the number of lines may be another than one or five.

Note that, in FIGS. 10 and 11, the light intensity is remarkably larger in the area closer to the minus side than −90° (farther from the virtual center plane Pv), however, the area is outside of the projection surface SC and not used for detection of the position (reflection position) of the pointer.

The second light emitting unit 4 includes the second optical element 43 formed symmetrically with the first optical element 33, and emits light with suppressed interference fringes and noise like the first optical element 33.

As described above, the following advantages can be obtained according to the embodiment.

(1) The light emitting apparatus 2 has the plurality of small lenses 330 that spread the light entered by the first optical element 33 in the direction corresponding to the width direction H (predetermined direction) and the plurality of small lenses 430 that spread the light entered by second optical element 43 in the direction corresponding to the width direction H (predetermined direction). Thereby, the light emitting apparatus 2 can emit light with suppressed deviation of the light intensity distribution in the area along the projection surface SC even when the alignment accuracy between the first light source 31 and the first optical element 33 and the alignment accuracy between the second light source 41 and the second optical element 43 are relaxed compared to a configuration having a light emitting unit formed with a single lens that spreads entering light.

Further, in the light emitting apparatus 2, the respective first optical element 33 and second optical element 43 have the plurality of small lenses 330 and 430 in different sizes as described above, and emit lights with suppressed interference fringes and noise of light intensity.

Therefore, the light emitting apparatus 2 with reduced assembly man-hour that emits light with suppressed deviation of the light intensity distribution and noise in the area along the projection surface SC can be provided.

(2) The light emitting apparatus 2 includes the first light emitting unit 3 and the second light emitting unit 4 that emit lights mainly in the different directions from each other, and thereby, can emit light along the wider projection surface SC.

(3) The first light emitting unit 3 and the second light emitting unit 4 are placed so that the first optical path and the second optical path may cross. Thereby, the light emitting apparatus 2 can be formed with the first optical element 33 in the first light emitting unit 3 and the second optical element 43 in the second light emitting unit 4 closer to each other. Accordingly, the position in which the lights emitted from the respective first light emitting unit 3 and second light emitting unit 4 overlap can be made closer to the light emitting apparatus 2. Therefore, the light emitting apparatus 2 that can be downsized in the direction in which the first optical element 33 and the second optical element 43 are arranged and placed closer to the projection surface SC can be provided.

(4) The image display system 100 includes the light emitting apparatus 2, and thereby, can accurately detect the position of the pointer or the like operated on the projection surface SC in the imaging apparatus 16 (detection apparatus) and project an image according to the detection result e.g. an image containing the trajectory of the pointer on the projection surface SC on the projection surface using the projection apparatus.

Note that the invention is not limited to the above described embodiment, but various changes and improvements can be made to the above described embodiment. As below, modified examples will be described.

Modified Example 1

Figure 12:
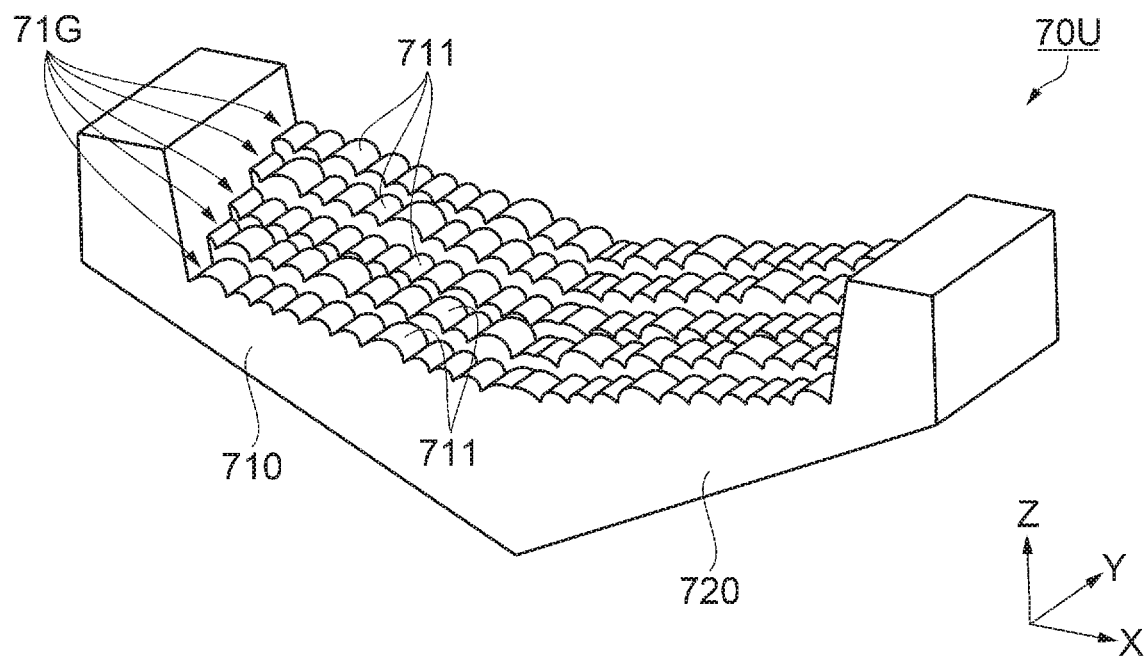
FIG. 12 is a perspective view showing an optical element member of modified example 1.
Figure 13:
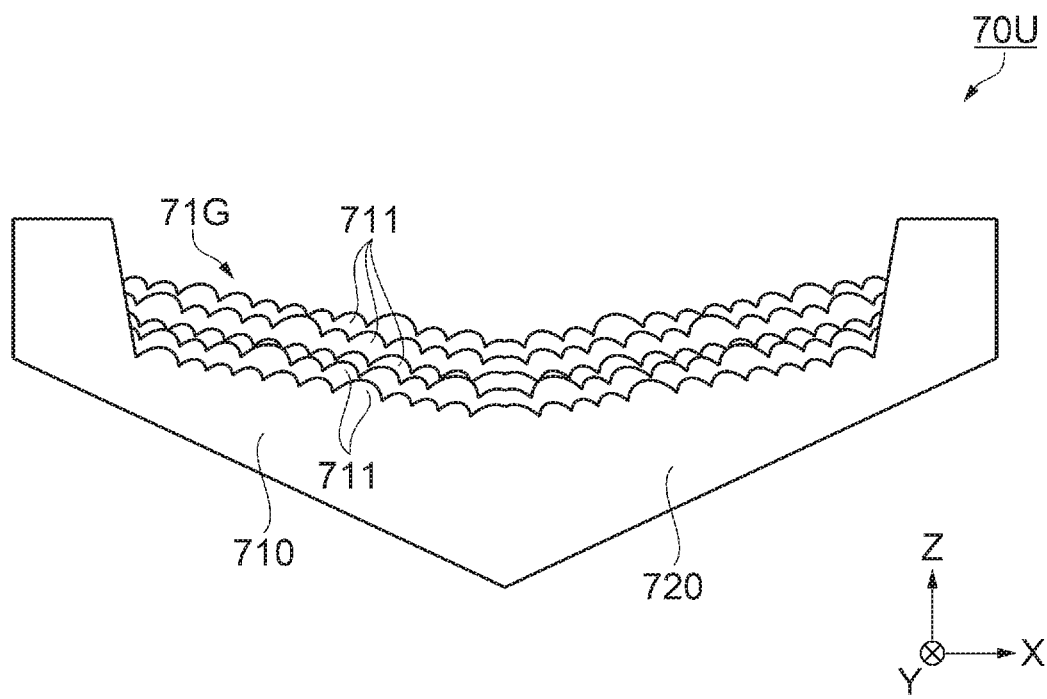
FIG. 13 is a plan view showing the optical element member of modified example 1.

FIG. 12 is a perspective view showing an optical element member 70U of modified example 1. FIG. 13 is a plan view of the optical element member 70U as seen from the −Y side.

As shown in FIGS. 12 and 13, the optical element member 70U has a first optical element 710 and a second optical element 720 symmetrically formed like the optical element member 34U of the above described embodiment. Specifically, the first optical element 710 provided on the left side of the optical element member 70U is explained with a focus thereon.

The first optical element 710 is formed on the light-incident side and has first to nth (n is an integer equal to or larger than two) lens groups 71G sequentially placed in a stepped pattern from one end (the end on the −Y-side) toward the other end (the end on the +Y-side) in the Y-direction (first direction). FIG. 12 shows the optical element member 70U for n=5.

Each lens group 71G has a plurality of small lenses 711 arranged in the second direction. The plurality of lens groups 71G are formed to have the small lenses 711 with the small lenses adjacent in the first direction and the second direction in different sizes from each other.

The plurality of small lenses 711 in the nth lens group 71G project further than the small lenses 711 adjacent in the first direction (Y-direction) in the (n−1)th lens group 71G. In other words, the first optical element 710 is formed so that the respective small lenses 711 do not hide behind the other small lenses 711 as seen from the −Y-side. Note that the one end side is set to the end side on the −Y-side, however, the one end side may be set to the end side on the +Y-side.

According to the configuration, the optical element member 70U can be manufactured using a mold without undercut or draft angle that affects optical characteristics. Therefore, the optical element member 70U that offers the above described advantages and is easily manufactured, i.e., the light emitting apparatus that is easily manufactured can be provided.

Modified Example 2

Figure 14:
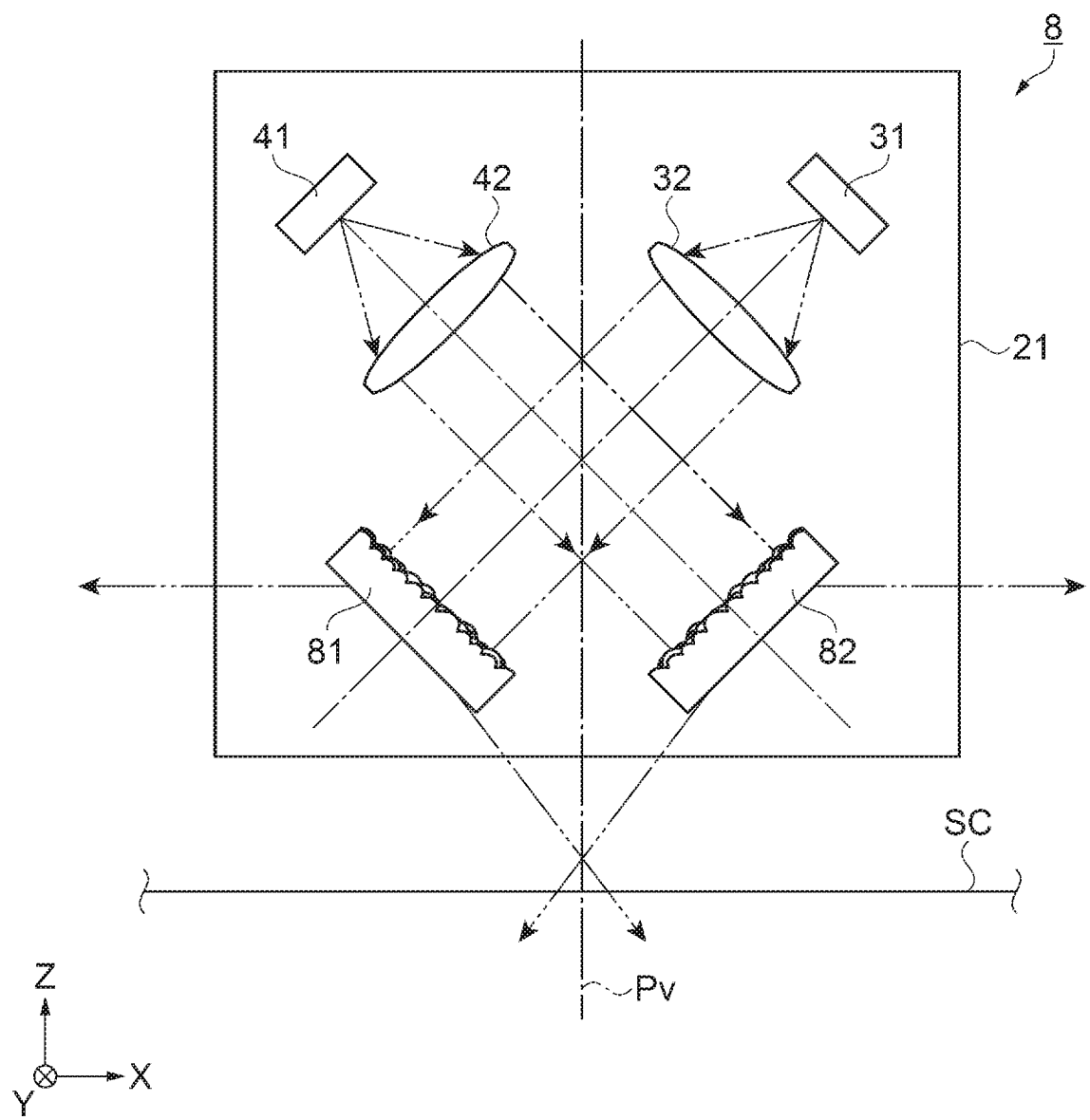
FIG. 14 is a perspective view showing a light emitting apparatus of modified example 2.

FIG. 14 is a perspective view showing a light emitting apparatus 8 of modified example 2.

In the light emitting apparatus 2 of the above described embodiment, the first optical element 33 and the second optical element 43 are integrally formed, however, as shown in FIG. 14, a configuration having a first optical element 81 and a second optical element 82 separately formed in place of the optical element member 34U may be employed.

Modified Example 3

Figure 15:
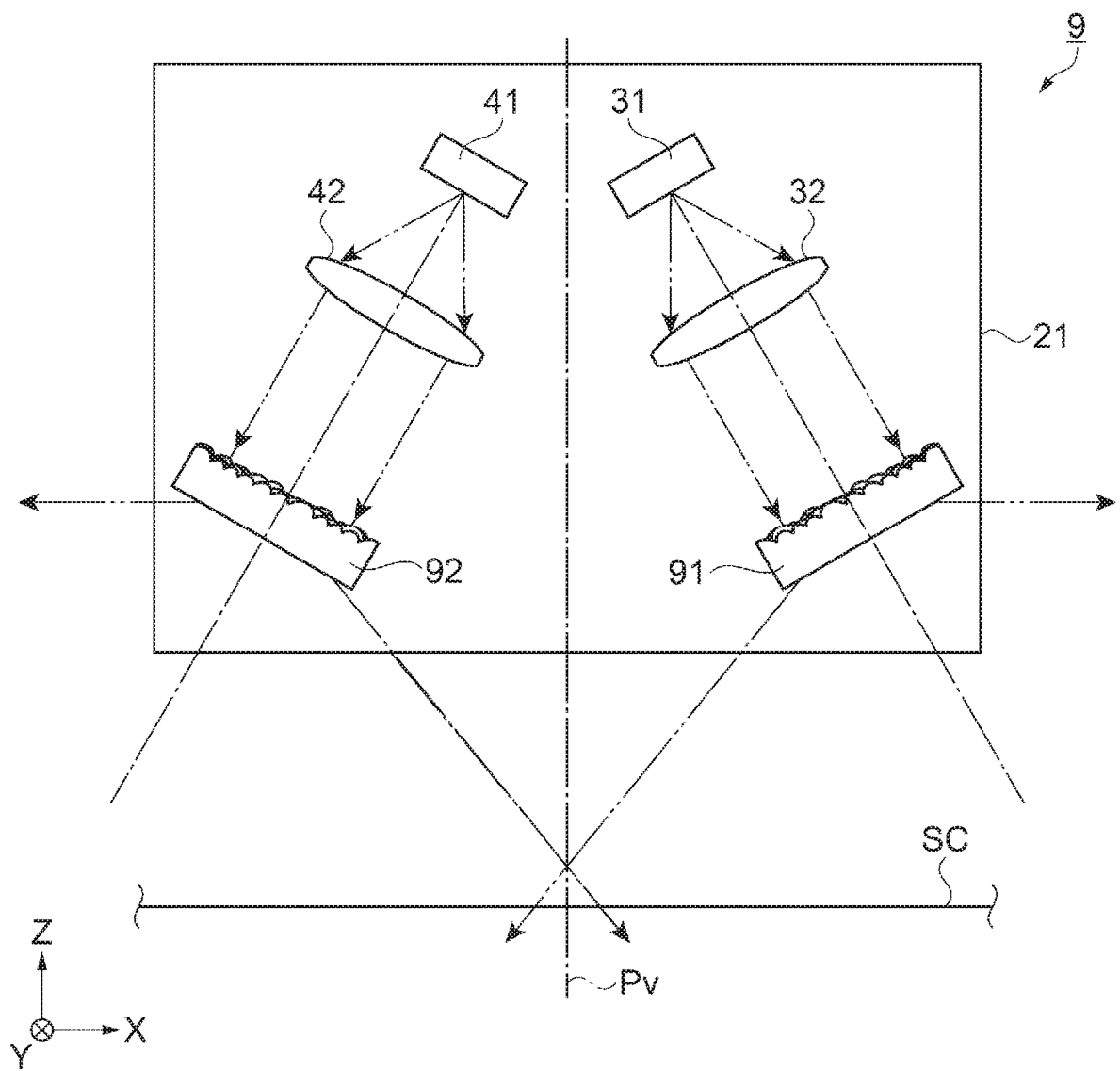
FIG. 15 is a perspective view showing a light emitting apparatus of modified example 3.

FIG. 15 is a perspective view showing a light emitting apparatus 9 of modified example 3.

In the light emitting apparatus 2 of the above described embodiment, the first optical element 33 and the second optical element 43 are integrally formed and the first optical path and the second optical path cross, however, a configuration shown in FIG. 15 may be employed. That is, the configuration having a first optical element 91 and a second optical element 92 separately formed in place of the optical element member 34U, in which the first optical path and the second optical path do not cross, may be employed.

Modified Example 4

The optical element member 34U of the above described embodiment and the optical element member 70U of the modified example 1 are symmetrically formed, however, not necessarily symmetrically formed.

Modified Example 5

A light emitting apparatus including one, three, or more light emitting units may be formed.

Modified Example 6

In the above described embodiment, as the image display system, the front-type configuration that projects an image from the front side of the projection surface SC is explained, however, the system is not limited to that as long as the configuration uses an apparatus that displays an image. For example, a rear-type projector that projects an image from the back side of the screen or a configuration having a liquid crystal display, CRT (Cathode Ray Tube), plasma display, organic EL display, or the like in place of the screen on which an image is projected may be employed.

The entire disclosure of Japanese Patent Application No. 2017-236661, filed on Dec. 11, 2017 is expressly incorporated by reference herein.

What is claimed is:

1. A light emitting apparatus comprising a light emitting unit, the light emitting unit including:
   a light source;
   a collimator lens that light emitted from the light source enters; and
   an optical element that spreads the light transmitted through the collimator lens in a direction corresponding to a predetermined direction orthogonal to an optical axis of the light source,
   wherein the optical element has a plurality of lens groups arranged in a first direction orthogonal to the optical axis and the predetermined direction,
   each of the plurality of lens groups has a plurality of small lenses arranged in a second direction orthogonal to the first direction and crossing the optical axis,
   each of the plurality of small lenses is formed to spread entering light in a direction corresponding to the predetermined direction so that the lights spread by the small lenses adjacent to each other in the second direction are superimposed,
   the plurality of small lenses have the small lenses with the small lenses adjacent in the first direction and the second direction in different sizes from each other,
   the plurality of lens groups are provided on a light-incident side of the optical element and have first to nth (n is an integer equal to or larger than two) lens groups sequentially placed in a stepped pattern from one end side to the other end side in the first direction, and the plurality of small lenses in the nth lens group project farther than the small lenses adjacent in the first direction in the (n−1)th lens group.

2. The light emitting apparatus according to claim 1, further comprising
a first of the light emitting unit and a second of the light emitting unit that emit lights mainly in different directions from each other,
wherein the first light emitting unit and the second light emitting unit are placed so that respectively spread lights travel along a predetermined flat surface and parts of the respectively spread lights overlap with each other.

3. The light emitting apparatus according to claim 2, wherein
the first light emitting unit has a first optical path from a light source to the optical element of the first light emitting unit,
the second light emitting unit has a second optical path from a light source to the optical element of the second light emitting unit, and
the first optical path and the second optical path cross at upstream of the optical element in the first light emitting unit and the optical element in the second light emitting unit.

4. An image display system comprising:
the light emitting apparatus according to claim 1;
a detection apparatus that detects a reflection position of light emitted from the light emitting apparatus; and
a projection apparatus that projects an image according to a detection result detected by the detection apparatus.

5. An image display system comprising:
the light emitting apparatus according to claim 2;
a detection apparatus that detects a reflection position of light emitted from the light emitting apparatus; and
a projection apparatus that projects an image according to a detection result detected by the detection apparatus.

6. An image display system comprising:
the light emitting apparatus according to claim 3;
a detection apparatus that detects a reflection position of light emitted from the light emitting apparatus; and
a projection apparatus that projects an image according to a detection result detected by the detection apparatus.

7. A light emitting apparatus comprising a light emitting unit, the light emitting unit including:
a first light source;
a second light source;
a first collimator lens that light emitted from the first light source enters;
a second collimator lens that light emitted from the second light source enters; and
an optical element that spreads the light transmitted through the first collimator lens and the second collimator lens in a direction corresponding to a predetermined direction,
wherein the optical element has a first optical element and a second optical element integrally formed with each other,
the first optical element has a plurality of first lens groups arranged in a first direction,
each of the plurality of first lens groups has a plurality of first small lenses arranged in a second direction orthogonal to the first direction,
each of the plurality of first small lenses is formed to spread entering light in a direction corresponding to the predetermined direction,
the plurality of first small lenses have the small lenses with the small lenses adjacent in the first direction and the second direction in different sizes from each other, and
the first optical element is tilted so that a distance from the first collimator lens to the first optical element increases as the first optical element becomes distant from a boundary between the first optical element and the second optical element, and
the second optical element has a plurality of second lens groups arranged in the first direction,
each of the plurality of second lens groups has a plurality of second small lenses arranged in the second direction,
each of the plurality of second small lenses is formed to spread entering light in a direction corresponding to the predetermined direction,
the plurality of second small lenses have the small lenses with the small lenses adjacent in the first direction and the second direction in different sizes from each other, and
the second optical element is tilted so that a distance from the second collimator lens to the second optical element increases as the second optical element becomes distant from the boundary between the first optical element and the second optical element.

8. A light emitting apparatus comprising first and second light emitting units that emit lights mainly in different directions from each other, each of the first and second light emitting units including:
a light source;
a collimator lens that light emitted from the light source enters; and
an optical element that spreads the light transmitted through the collimator lens in a direction corresponding to a predetermined direction orthogonal to an optical axis of the light source,
wherein the optical element has a plurality of lens groups arranged in a first direction orthogonal to the optical axis and the predetermined direction,
each of the plurality of lens groups has a plurality of small lenses arranged in a second direction orthogonal to the first direction and crossing the optical axis,
each of the plurality of small lenses is formed to spread entering light in a direction corresponding to the predetermined direction so that the lights spread by the small lenses adjacent to each other in the second direction are superimposed,
the plurality of small lenses have the small lenses with the small lenses adjacent in the first direction and the second direction in different sizes from each other, and
the first light emitting unit and the second light emitting unit are placed so that respectively spread lights travel along a predetermined flat surface and parts of the respectively spread lights overlap with each other.

* * * * *